(12) United States Patent  (10) Patent No.: US 7,464,955 B2
Ahlberg et al.  (45) Date of Patent: Dec. 16, 2008

(54) ARTICULATED VEHICLE

(75) Inventors: Jörgen Ahlberg, Växjö (SE); Ivar Aaboen, Hisings-Backa (SE); Rickard Nilsson, Älvängen (SE); Lena Larsson, Västra Frölunda (SE)

(73) Assignee: Volvo Construction Equipment AB, Braas (SE)

( * ) Notice: Subject to any disclaimer, the term of this patent is extended or adjusted under 35 U.S.C. 154(b) by 0 days.

(21) Appl. No.: 10/707,486

(22) Filed: Dec. 17, 2003

(65) Prior Publication Data
US 2004/0212174 A1 Oct. 28, 2004

Related U.S. Application Data

(63) Continuation of application No. PCT/SE02/01053, filed on Jun. 3, 2002, now abandoned.

(30) Foreign Application Priority Data
Jun. 18, 2001 (SE) .................................. 0102163

(51) Int. Cl.
B60D 1/00 (2006.01)
(52) U.S. Cl. ................ 280/474; 280/124.111; 280/124.112
(58) Field of Classification Search ......... 280/474, 280/124.11, 124.12, 754, 755, DIG. 1, 400, 280/43.17, 6.156, 124.15, 124.111, 124.112; 180/900, 21, 14.1, 14.4
See application file for complete search history.

(56) References Cited

U.S. PATENT DOCUMENTS

| 3,426,720 | A | * | 2/1969 | Enos ........................ 440/12.66 |
| 3,572,746 | A | * | 3/1971 | Mueller .................... 280/6.158 |
| 3,953,040 | A | * | 4/1976 | Unruh et al. ............. 280/6.151 |
| 4,079,955 | A | * | 3/1978 | Thorpe et al. ................ 280/474 |
| 4,099,733 | A | * | 7/1978 | Ahonen ....................... 280/400 |
| 4,235,308 | A |   | 11/1980 | Davis .......................... 187/9 R |
| 4,313,616 | A |   | 2/1982 | Howard ................... 280/446 B |
| 4,353,572 | A | * | 10/1982 | McCain ....................... 280/492 |
| 4,556,231 | A |   | 12/1985 | Schultz ....................... 280/432 |
| 5,209,320 | A |   | 5/1993 | Harrer ......................... 180/235 |
| 5,639,119 | A | * | 6/1997 | Plate et al. .................. 280/754 |
| 5,806,870 | A |   | 9/1998 | Hull et al. ................... 280/400 |
| 6,082,742 | A | * | 7/2000 | Ishikawa ................. 280/5.508 |
| 2002/0093153 | A1 | * | 7/2002 | Scotese et al. ........... 280/6.153 |

FOREIGN PATENT DOCUMENTS

| FI | 96756 A | 5/1996 |
| GB | 1166219 | 10/1969 |
| JP | 58164481 A | 9/1983 |
| SU | 958199 A | 9/1982 |

* cited by examiner

Primary Examiner—Anne Marie Boehler
(74) Attorney, Agent, or Firm—Novak Druce + Quigg LLP

(57) ABSTRACT

Method and arrangement including a vehicle having a first and a second vehicle section connected to an articulation that allows rotation about a vehicle longitudinal axis of the vehicle. A positioning arrangement is included that has at least one adjusting device in which the positioning arrangement includes operation by at least one adjusting device in order to rotate the first and second vehicle sections into a predefined basic position in relation to one another.

14 Claims, 3 Drawing Sheets

ARTICULATED VEHICLE

CROSS REFERENCE TO RELATED APPLICATIONS

The present application is a continuation patent application of International Application No. PCT/SE02/01053 filed 3 Jun. 2002 which was published in English pursuant to Article 21(2) of the Patent Cooperation Treaty, and which claims priority to Swedish Application No. 0102163-3 filed 18 Jun. 2001. Both applications are expressly incorporated herein by reference in their entireties.

BACKGROUND OF INVENTION

1. Technical Field

The present invention relates to a vehicle comprising (including, but not limited to) a first and a second frame section connected by an articulation (articulated connection), in which a positioning arrangement is capable of orienting the frame sections in relation to one another about the longitudinal axis of the vehicle, as well as a method for effecting the same.

2. Background

Articulated vehicles are familiar to the person skilled in the art, such as found in the example of British Patent Publication, GB 2258437, which is expressly incorporated herein by reference. An articulated vehicle has a frame that is divided into a front and a rear frame half, which are connected by way of an axially aligned cylindrical bearing. The articulation consists, for example, of a cylinder (fixed to the one frame half) in which a pin (fixed in the second frame half) is supported. The articulation may also be of the sluing ring bearing type. On an articulated vehicle, the frame halves can rotate in relation to one another along the axis of rotation of the bearing in the longitudinal direction of the vehicle. Exemplary articulated vehicles include dump trucks, a wheeled loaders and forklift trucks. A significant advantage of utilizing an articulated connection is that the wheels of the vehicle obtain better ground contact on uneven surfaces. A major disadvantage, however, is that the stability of the vehicle is reduced. For a dump truck, reduced stability is a disadvantage, among other things, when the vehicle is to be driven at high speed. For a wheeled loader or a fork-lift truck, reduced stability is a disadvantage, among other things, in the case of heavy and/or high lifting. There are therefore instances where it is desirable to lock the front frame half together with the rear frame half in order to increase the stability of the vehicle.

One method that has been proposed for locking the frame halves to one another is to use a locking pin that is inserted into a corresponding hole. A disadvantage of this solution is that the vehicle must be standing level in order to be able to insert the locking pin in position. Another disadvantage is that this makes the locking entirely rigid without any resilient characteristics and places an unnecessarily high load on the vehicle when driving over broken ground. There is also a greater risk of a rigid vehicle overturning. A locking arrangement with such a locking pin is described, for example, in GB 1166219, JP 58164481, GB 2258437, SU 958199, U.S. Pat. Nos. 5,806,870 and 4,079,955.

Another solution-method that has been proposed is to lock the frame halves by means of a brake arrangement in the form of a disc or drum brake. A disadvantage with this method is again that the vehicle must be standing level when the brake is applied in order that the vehicle will be locked in a position in which the frame halves lie in one plane with one another. Another disadvantage with this method of locking is that there is nothing to indicate that the frame halves are lying in one plane. If the frame halves are locked when they are not lying in one plane, this will result in inferior driving characteristics and uneven weight distribution. A locking arrangement in which the locking is achieved with a brake arrangement is described, for example, in U.S. Pat. No. 4,235,308 and DE 2701813.

Another type of brake arrangement is described in U.S. Pat. No. 4,353,572 in which two hydraulic cylinders that are connected to one another are used as a locking arrangement. In order to lock the articulation, the oil flow between the cylinders is shut off by means of a valve, the valve being opened if a rotatable articulation is required. A major disadvantage with this solution is that it does not permit large angles of rotation between the frame halves; something that can be catastrophic when there is a risk of the vehicle overturning. Another disadvantage is again that the vehicle must be standing level when the locking is applied in order that the vehicle will be locked in a position in which the frame halves lie in one plane with one another. Yet another disadvantage with this method of locking is that there is nothing to indicate that the frame halves lie in one plane.

SUMMARY OF INVENTION

The object of the invention is therefore to provide a vehicle having an articulation in which a positioning arrangement can rotate the frame halves into a predefined basic position, together with a method of positioning the frame halves in a predefined basic position.

The object of the invention is achieved by a vehicle having a first vehicle section and a second vehicle section, which are connected by an articulation, which allows the first and the second vehicle sections to rotate in relation to one another about the longitudinal axis of the vehicle, and having a positioning arrangement comprising at least one adjusting device, in that the positioning arrangement comprises at least one means of operation operated by a minimum of one adjusting device inorder to rotate the first and second vehicle sections into a predefined basic position in relation to one another.

The method according to the invention achieves the object in that at least one adjusting device rotates at least one of the vehicle sections into the predefined basic position.

This first embodiment of the vehicle according to the invention provides a vehicle, the frame halves of which can be brought from a position in which the frame halves do not lie in one plane, into a predefined basic position in which the frame halves do lie in one plane. The advantage with this is that the frame halves of the vehicle can be brought to lie in one plane with one another from a position in which they are rotated in relation to one another.

In an advantageous first development of the vehicle according to the invention, the positioning arrangement has a fixed and an unfixed condition. The purpose of this is to be able to fix the frame halves to one another when they lie in one plane.

In an advantageous second development of the vehicle according to the invention, the positioning arrangement comprises two guide arms. The advantage of this is that it gives the positioning arrangement a simple and robust design.

In an advantageous third development of the vehicle according to the invention, the positioning arrangement comprises two geared devices. The advantage of this is that the torque with which the adjusting device must act is geared down.

In an advantageous fourth development of the vehicle according to the invention, the force that locks the frame halves of the vehicle to one another can be adjusted or controlled. The advantage of this is that the damping and/or the elasticity in the positioning arrangement can be adjusted in order to suit different driving situations.

In an advantageous fifth development of the vehicle according to the invention, the positioning arrangement comprises means that define the predefined basic position. The advantage of this is that the predefined basic position is easy to achieve.

In an advantageous sixth development of the vehicle according to the invention, the positioning arrangement can be disengaged in the event of a particular occurrence. The purpose of this is to disengage the frame halves from one another when a particular need arises, for example where there is a risk of overturning.

In an advantageous seventh development of the vehicle according to the invention, the positioning arrangement can be activated in the event of a particular occurrence. The purpose of this is to fix the frame halves to one another when a particular need exists, for example in order to stabilize the vehicle when driving in excess of certain speed.

In an advantageous eighth development of the vehicle according to the invention, the positioning arrangement is divided up into a number of sections. The advantage of this is that they can be fitted easily and inexpensively.

In an advantageous ninth development of the vehicle according to the invention, the guide arms are supported concentrically with the articulation bearing. The advantage of this is that the semi-operative area of the positioning arrangement can be enlarged.

In an advantageous tenth development of the vehicle according to the invention, the positioning arrangement comprises one or more brake arrangements. The advantage of this is that the frame halves can be fixed by a special brake, even if the means of operation does not have a fixing facility.

In an advantageous eleventh development of the vehicle according to the invention, the positioning arrangement has hydraulic means of operation. The purpose of this is to make use of power sources available on the vehicle.

In an advantageous twelfth development of the vehicle according to the invention, the positioning arrangement has electrical means of operation. The advantage of this is that it is easy to control electrical means of operation.

A method, according to the invention, is provided for positioning the frame halves of an articulated vehicle in a predefined basic position in relation to one another which comprises the stage in which at least one of the vehicle sections is moved into the predefined basic position by means of at least one adjusting device. The advantage of this method is that the frame halves of the vehicle are brought to lie in one plane with one another from a position in which they are rotated in relation to one another.

In a first advantageous development of the method according to the invention, the frame halves are fixed to one another when they are in the predefined basic position. The purpose of this is to fix the frame halves to one another when they lie in one plane.

In a second advantageous development of the method according to the invention, two guide arms positioned on the one frame half are brought against two bearing surfaces positioned on the second frame half. The advantage of this method is that positioning and locking of the vehicle halves are performed in the same working cycle.

In a third advantageous development of the method according to the invention, an adjusting device rotates a gear positioned on the first vehicle section against a gear segment positioned on the second vehicle section. The advantage of this method is that positioning of the frame halves in the predefined basic position can be performed regardless of the extent to which the frame halves are rotated in relation to one another.

In a fourth advantageous development of the method according to the invention, the force fixing the frame halves of the vehicle to one another can be adjusted. The advantage of this is that the positioning arrangement also acquires damping characteristics.

In a fifth advantageous development of the method according to the invention, the frame halves can pass from the predefined basic position to an undefined position in the event of at least one first predefined occurrence. The purpose of this is to disengage the frame halves from one another when a particular need exists, for example where there is a risk of overturning.

In a sixth advantageous development of the method according to the invention, the vehicle sections can pass from an undefined position into the predefined basic position in the event of at least one second predefined occurrence. The purpose of this is to fix the frame halves to one another when a particular need exists, for example in order to stabilize the vehicle when driving in excess of certain speed.

BRIEF DESCRIPTION OF DRAWINGS

The invention will be described in more detail below, with reference to exemplary embodiments which are illustratively shown in the accompanying drawings in which.

DETAILED DESCRIPTION

The exemplary embodiments of the invention and developments (enhancements, modifications and the like) described below must be regarded solely as examples and in no way limit the scope of the patent claims. In the exemplary embodiments here described, the same reference numbers in the various figures relate to the same type of part. Each part therefore, is not described in detail in all exemplary embodiments.

Figure 1:
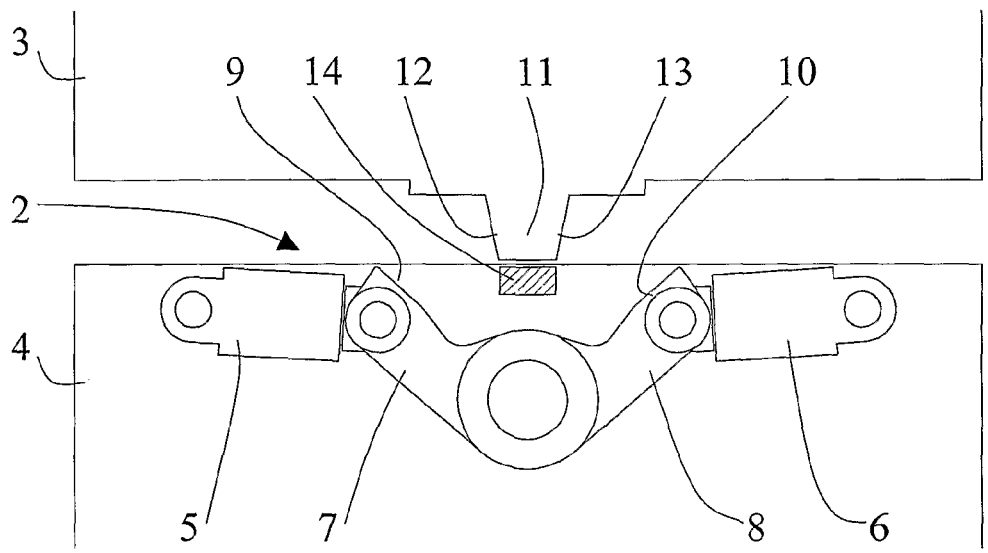
FIG. 1 shows an advantageous first exemplary embodiment of a positioning arrangement in an opened position for a vehicle configured according to the teachings of the invention.
Figure 2:
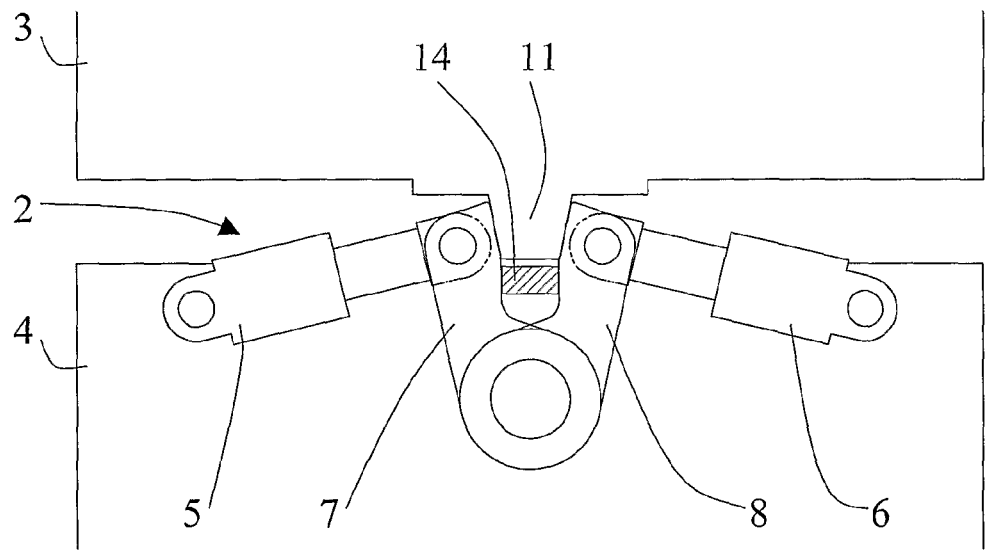
FIG. 2 shows the first exemplary embodiment of a positioning arrangement according to FIG. 1 in a fixed position.

In a first exemplary embodiment of a positioning arrangement for a vehicle 1 according to the present invention, the positioning arrangement 2 comprises two adjusting devices 5, 6, two guide arms 7, 8 and a stop block 14 fitted to the rear frame half 4 of the vehicle and an operating heel 11 fitted to the front frame half 3 of the vehicle as shown in FIGS. 1 and 2.

The type of adjusting device is chosen in order to suit the application. Parameters that affect the choice are, for example, the desired stroke length, maximum force, size and the like. An adjusting device may be provided in the form of a hydraulic or pneumatic cylinder, for example, or some type of motor, such as a linear motor or a rotary motor with a transmission. In the illustration, a hydraulic cylinder is used as an example of an adjusting device. The positioning arrangement can be mounted in an axial direction, a radial direction or at any angle to the axis of rotation of the articulation. In the first-illustrated exemplary embodiment, the positioning arrangement is mounted in an axial direction. The design, bearing point and fixing point of a guide arm for the adjusting device may be freely selected to suit the application.

FIG. 1 shows the positioning arrangement 2 in an opened position viewed from above. Here the hydraulic cylinders 5, 6 are brought together into their one limit position, so that the guide arms 7, 8 are thereby in a position in which the operating heel 11 can rotate freely and the frame halves 3, 4 can thereby rotate in relation to one another.

In order to achieve the fixed position, the hydraulic cylinders 5, 6 are pressurized so that the guide arms 7, 8 are displaced against the stop block 14 and bearing surfaces 12, 13 of the operating heel 11. In this position, the frame halves 3, 4 are fixed to one another.

FIG. 2 shows the positioning arrangement 2 in its fixed position. Here, the hydraulic cylinders 5, 6 are expanded to their second limit position, so that the guide arms 7, 8 are displaced into a position in which the operating heel 11 is prevented from rotating. This is achieved by the bearing surfaces 9, 10 on the guide arms 7, 8 bearing against the bearing surfaces 12, 13 on the operating heel 11. The guide arms 7, 8 are fitted to the rear frame half 4 of the vehicle and the operating heel 11 is fitted to the front frame half 3 of the vehicle. Also fitted to rear frame half 4 of the vehicle is a stop block 14. The stop block 14 defines the basic position for the frame halves 3, 4, that is to say when the guide arms 7, 8 bear against the stop block 14 and the operating heel 11, the frame halves lie in one plane with one another. This means that the vehicle is optimally aligned.

Since the vehicle sections are virtually always somewhat rotated in relation to one another, it is advantageous that there should be a well-defined basic position in which the frame halves lie in one plane with one another. In this basic position the frame halves are aligned with one another; that is to say, the frame halves have the same position in relation to one another as when the vehicle is standing on an entirely, or at least substantially level, horizontal surface. This basic position of the frame halves may be defined in a number of ways. It may be done by means of a stop block as in the exemplary embodiment described. Another method is to use a feedback system with some form of sensor that sends control signals to the adjusting device. It is also possible to make the limit positions of the hydraulic cylinders correspond to the basic position. Yet another method is to design the positioning arrangement so that the guide arms move simultaneously and symmetrically towards the desired basic position, for example through the use of an adjusting device.

A positioning arrangement described above, in which the frame halves are fixed when they lie in one plane relative to one another, ensures that a vehicle in which the front and the rear frame half are rotated in relation to one another is not driven on the highway. This would give an uneven load distribution and inferior driving characteristics. The angle from which the positioning arrangement must be capable of bringing the frame halves into the basic position is determined, in this exemplary embodiment, by the geometry of the operating heel and guide arms. A suitable permitted maximum angle in this case, for example, might be plus or minus 15 degrees.

In a first development, the positioning arrangement 2 is not entirely rigid, but rather the frame halves are fixed to one another somewhat flexibly. This is done so that the positioning arrangement will be able to absorb and dampen minor vibrations; that is to say, minor torsional movements between the vehicle sections. This reduces the stresses acting on the positioning arrangement and the vehicle, while at the same time improving the driveability. One way of obtaining a certain flexibility is to provide bearing surfaces 9, 10 of the guide arms with an elastic material, such as rubber. Another way is to fasten the entire positioning arrangement 2 in a flexibly suspended frame. Yet another way is to design the guide arms 7, 8 with a geometry such that a certain flexibility is obtained.

In a second development, the positioning arrangement has a semi-operative condition; that is to say, the force that the adjusting devices 5, 6 exert on the guide arms 7, 8 is adjustable or controllable. The purpose of this is to be able to adjust the flexibility and/or damping of the positioning arrangement so that torsional movements between the vehicle sections can be damped. This reduces the stresses acting on the positioning arrangement and the vehicle while at the same time improving driveability. Adjustment of the force can be achieved in a number of ways. Where hydraulic cylinders are used as the adjusting device as in this exemplary embodiment, a system with valves and an accumulator tank can be used. The valves are controlled by a control unit that receives information from sensors and/or the control unit of the vehicle. It is also possible to use an active feedback system with sensors, valves and a pump. The valves and the pump are controlled by a control unit that receives information from the sensors and/or a control unit of the vehicle (vehicle control unit).

The flexibility and/or damping of the positioning arrangement can be freely selected and advantageously adapted to the driving situation. Thus, for example, a low flexibility and low damping; that is to say, a rigid fixing may be desirable when driving at high speed on a level road, while a high flexibility and greater damping can be desirable at lower speeds and/or on uneven ground. Adjustment of the flexibility and/or damping of the positioning arrangement can be achieved by a function which includes one or more of the variables: pressure in a cylinder, angle of inclination of the vehicle, angular difference between the frame halves, speed of the vehicle and current turning radius.

In a third development, the positioning arrangement can be automatically disengaged from a fixed or damping condition so that the vehicle halves can rotate freely in relation to one another. This is desirable, for example, when driving over uneven ground where there is a risk of the vehicle overturning. If the articulation is disengaged, the rear frame half can be allowed to overturn without the cab that contains the driver overturning. Such disengagement may be triggered when a predefined value is exceeded. This value, for example, may be a function which includes one or more of the variables: pressure in a cylinder, angle of the vehicle, angular difference between the frame halves, speed of the vehicle and current turning radius. Disengagement is advantageously allowed to occur over a certain length of time; that is to say, with a certain amount of damping so that the disengagement occurs smoothly.

In a fourth development, the positioning arrangement can automatically assume a fixed or damping condition from the disengaged condition. This may be desirable, for example, when driving on a level road when the speed increases in order to stabilize the vehicle. This transition to a fixed or sprung condition can be initiated when a predefined value is attained. This value, for example, may be a function which includes one or more of the variables: pressure in a cylinder, angle of the vehicle, angular difference between the frame halves, speed of the vehicle or current turning radius. The locking sequence is advantageously allowed to occur over a certain length of time so that the locking engages smoothly. It is also possible to inhibit this automatic locking facility when a predefined value is exceeded, for example when the frame halves are rotated by more than a certain number of degrees in relation to one another.

Figure 3:
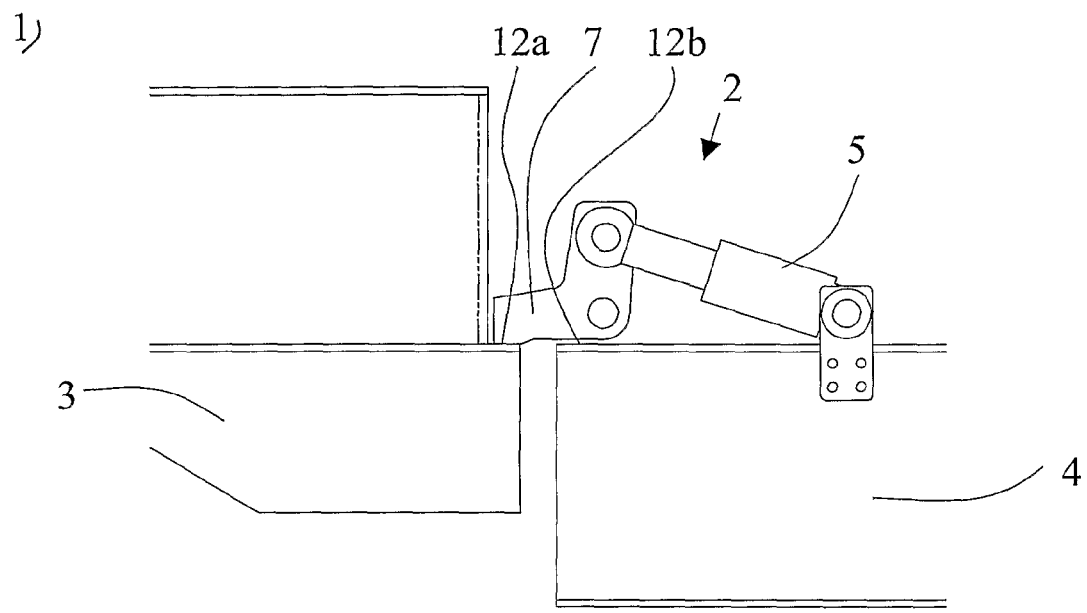
FIG. 3 shows an advantageous second exemplary embodiment of a positioning arrangement in a fixed position for a vehicle configured according to the invention.

In a second exemplary embodiment of a positioning arrangement for a vehicle according to the invention, the positioning arrangement is divided into two sections. One section comprises an adjusting device and a guide arm. FIG. 3 shows a side view of a section comprising an adjusting device 5 in the form of a hydraulic cylinder and a guide arm 7. In this exemplary embodiment, the hydraulic cylinder 5 and the guide arm 7 are fitted to the left-hand side of the rear frame half 4 and a corresponding section is fitted to the right-hand side. It is an advantage if the sections are located symmetrically on either side of the axis of rotation of the articulation, for example in proximity to the outer sides of the frame. In the fixed position, the guide arm 7 thus acts against a bearing surface 12*a* on the front frame half 3. The geometry and the location of the positioning arrangement are suitably determined depending on what forces the arrangement must cope with and on the angle from which it must be possible to return the frame halves to the basic position. The defined basic position is most easily obtained by also having each guide arm bear against a bearing surface 12*b* on the rear frame half when the positioning arrangement is in the fixed condition. The disengaged condition of the positioning arrangement is achieved by bringing the hydraulic cylinder 5 together so that the guide arms allow the frame halves to rotate freely. In this exemplary embodiment, too, it may be advantageous to adjust the flexibility and/or damping of the positioning arrangement in the same way as has been described above.

The solutions that have been described with respect to the first and second exemplary embodiments are most suited to positioning the frame halves in the predefined basic position when the vehicle is on reasonably level ground; that is to say, when the frame halves are rotated relatively little in relation to one another. This rotation may be on the order of plus or minus 10 degrees, for example. This is due to the fact that the guide arms have a limited area of action. Normally, it is when the vehicle is being driven at higher speed on even ground that it is advantageous to fix the frame halves in the predefined position.

In certain cases, it may also be advantageous to have the facility for damping (capability to damp) the articulation when the vehicle is driving over heavily broken (uneven) ground. In these cases the positioning arrangement is required to have a larger area of action. The following describes an exemplary embodiment in which the area of action of the positioning arrangement is larger, up to an area of action of plus/minus 180 degrees.

Figure 4:
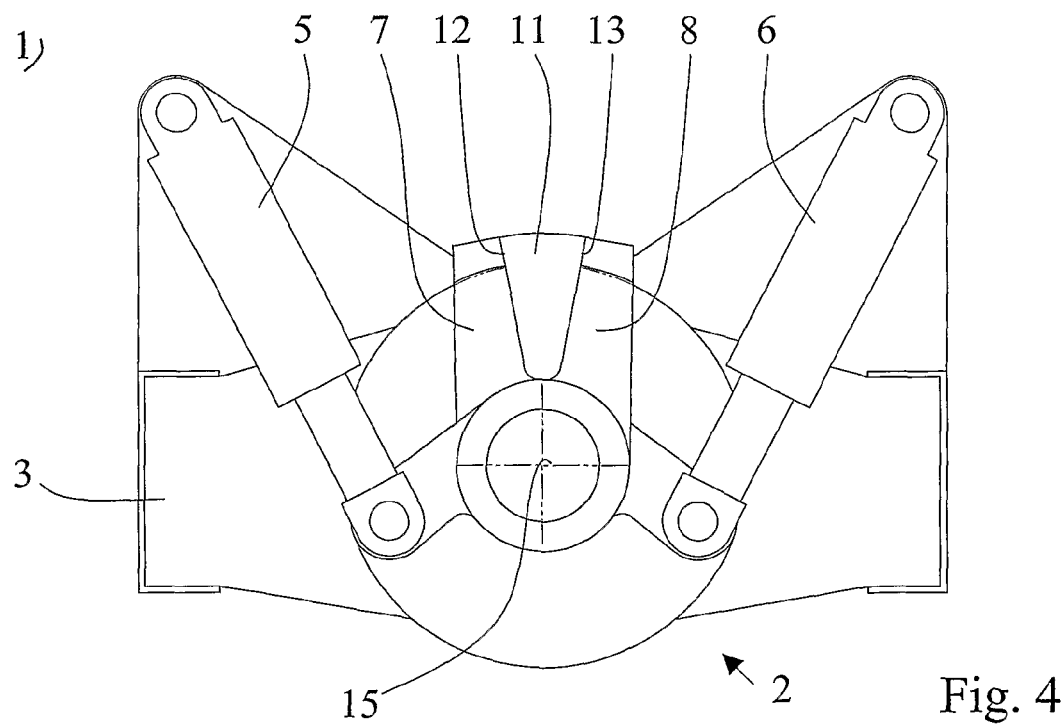
FIG. 4 shows an advantageous third exemplary embodiment of a positioning arrangement in a fixed position for a vehicle configured according to the invention.

In a third exemplary embodiment of a positioning arrangement for a vehicle configured according to the invention, the positioning arrangement 2 comprises two adjusting devices 5, 6, two guide arms 7, 8 and an operating heel 11 configured as exemplified in FIG. 4, and in which the positioning arrangement is shown in a fixed position. FIG. 4 shows the positioning arrangement in a section at right angles to the axis of rotation 15 of the articulation. The adjusting devices 5, 6 and the guide arms 7, 8 are fitted on the rear frame half (not shown) and the operating heel 11 is fitted on the front frame half 3. The guide arms 7, 8 are supported concentrically with the axis of rotation 15 of the articulation where the articulation is also supported.

The fixed position is obtained by the hydraulic cylinders 5, 6 being set to an intermediate position and the guide arms 7, 8 being thereby rotated into a position in which the operating heel 11 is prevented from rotating. This is achieved in that the bearing surfaces 9, 10 on the guide arms 7, 8 bear against the bearing surfaces 12, 13 on the operating heel 11. When the hydraulic cylinders are brought together, the articulation is disengaged. It is also possible to use the hydraulic cylinders to adjust the flexibility and/or damping of the positioning arrangement in the same way as has been described hereinabove.

This exemplary embodiment is advantageous for vehicles that are driven in very difficult terrain, since this solution permits a larger active damping range for the positioning arrangement. This solution also allows the rear frame half to overturn when the front frame half remains upright, even when the positioning arrangement is in an active damping area (range of operation). If the bearing point of the guide arms is located eccentrically along the axis of rotation of the articulation, the operating heel can be entirely disengaged from the guide arms so that the frame halves can rotate freely.

In a fourth exemplary embodiment of a positioning arrangement for a vehicle according to the invention, the positioning arrangement 2 comprises a gear segment 16, a gear 17 and a motor 18. Such a positioning arrangement is shown in side view in FIG. 5. The gear segment 16 is fitted on the front frame half 3 and the gear 17 and the motor 18 are fitted on the rear frame half 4.

In this example, the gear segment 16 is an entire gear encompassing 360 degrees. This means that the gear segment 16 and the gear 17 are in contact over the entire rotation of the articulation. That is to say, even if the cab overturns in one direction and the load body overturns in another direction, the gear segment 16 and the gear 17 are in contact. Alternatively, the gear segment 16 is designed as an angular section of a gear, for example 180 degrees, which means that the gear segment 16 and the gear 17 are in contact if the cab or the load body overturns. The angle of the gear segment is selected to suit the application of the vehicle in which the articulation is fitted. For a vehicle in which the capacity of the articulation to rotate is limited, to plus or minus 20 degrees, for example, the selected angle of the gear segment may be forty degrees, for example. Here, the gear segment 16 is fixed to the front frame half 3. For vehicles in which the articulation comprises a sluing ring bearing, the gear segment 16 may also be a part of the sluing ring bearing.

The radius of the gear segment 16 and the radius of the gear 17 are selected so as to obtain the desired ratio between the radii. This ratio is determined by the motor torque and the total torque that the motor must be capable of transmitting. If it is only required to be capable of rotating the one frame half through a few degrees, a lower torque will suffice. If it is required to be capable of righting the one frame half when it has overturned, a high torque and a powerful motor are required. Other factors may also influence the radius of the gear segment 16 and the radius of the gear 17, for example the choice of material and physical size.

The gear 17 is fitted to a shaft 19 that is driven by the motor 18 either directly or via some form of clutch arrangement or transmission, such as a gear drive, for example, or a safety friction clutch. The shaft 19 is advantageously supported and stabilized in some suitable way. This will be familiar to the person skilled in the art and therefore is not described or illustrated in greater detail.

The motor 18 may be hydraulic, electrical or of some other suitable type. The motor is suitably controlled so that the desired function of the positioning arrangement is achieved.

In this example, a hydraulic motor is used that is driven by a power take-off of the vehicle engine. The motor is controlled by valves, which are controlled by a control unit. When the positioning arrangement 2 is in its operative condition, the motor 18 rotates the rear frame half 4 to the predefined basic position in which the frame halves lie in one plane as defined hereinabove. This is accomplished by opening the valves, which cause the motor 18 to rotate the frame half to the basic position. When the basic position has been reached, the motor is locked through closing of the valves. When the motor is in its inoperative condition, the positioning arrangement 2 is disengaged entirely, so that the frame halves can rotate freely in relation to one another. This is achieved by the way of the valves isolating the motor from the hydraulic pressure of the power take-off.

The predefined, basic position may be detected by a sensor. Possible sensors include, for example, angular position sensors, angle of inclination sensors, magnetic or optical position sensors. The sensor or sensors may be located on both of the frame halves. The control system uses the sensor signals in order to calculate the position of the frame halves and position relative to one another. This is done in order to enable the system to rotate the one frame half in the correct direction for locking and in order to lock the articulation when the frame halves lie in one plane. Where possible, sensors already present on the vehicle may suitably be used. For example, an angle of inclination sensor on the cab and on the load body may be used in order to guide the frame halves into a position in which they lie in one plane. An angular position sensor in the articulation may be similarly used.

In a first development, the fixing of the frame halves is not entirely rigid, the positioning arrangement rather being somewhat flexible. This is done so that the positioning arrangement will be able to absorb and damp minor vibrations; that is to say, minor torsional movements between the vehicle sections. This reduces the stresses acting on the positioning arrangement and the vehicle whilst at the same time improving the driveability. One way of achieving a certain flexibility is to make the fixing of the gear 17 on the shaft 19 somewhat resilient. This can be done, for example, by means of coil springs or rubber. Another way of achieving a certain flexibility is to make the shaft 19 between the gear 17 and the motor 18 function as a torsion spring. The spring characteristics are then determined by the dimensions, material and length of the shaft. Yet another way is to fix the gear segment 16 and/or gear 17 and motor 18 flexibly to the frame halves.

In a second development, the motor 18 also has a semi-operative condition in which the force with which the motor acts is adjustable. The purpose of this is to be able to adjust or control the flexibility and/or damping of the positioning arrangement so that torsional movements between the vehicle sections can be damped and braked. This reduces the stresses acting on the positioning arrangement and the vehicle, while at the same time improving the driveability.

The force can be adjusted in a number of ways. For a hydraulic motor as in this exemplary embodiment, the adjustment is achieved by means of controllable valves. An accumulator tank may be used in order to increase the springing characteristics. The valves are controlled by a control unit, which receives information from sensors and/or the control unit of the vehicle. It is also possible to use an active feedback system with sensors, valves and a controllable hydraulic pump in which the hydraulic pressure is adjusted. The valves and the pump are controlled by a control unit that receives information from the sensors and/or control unit of the vehicle. For an electric motor, the adjustment is performed in the way most suited to the type of motor selected.

Figure 6:
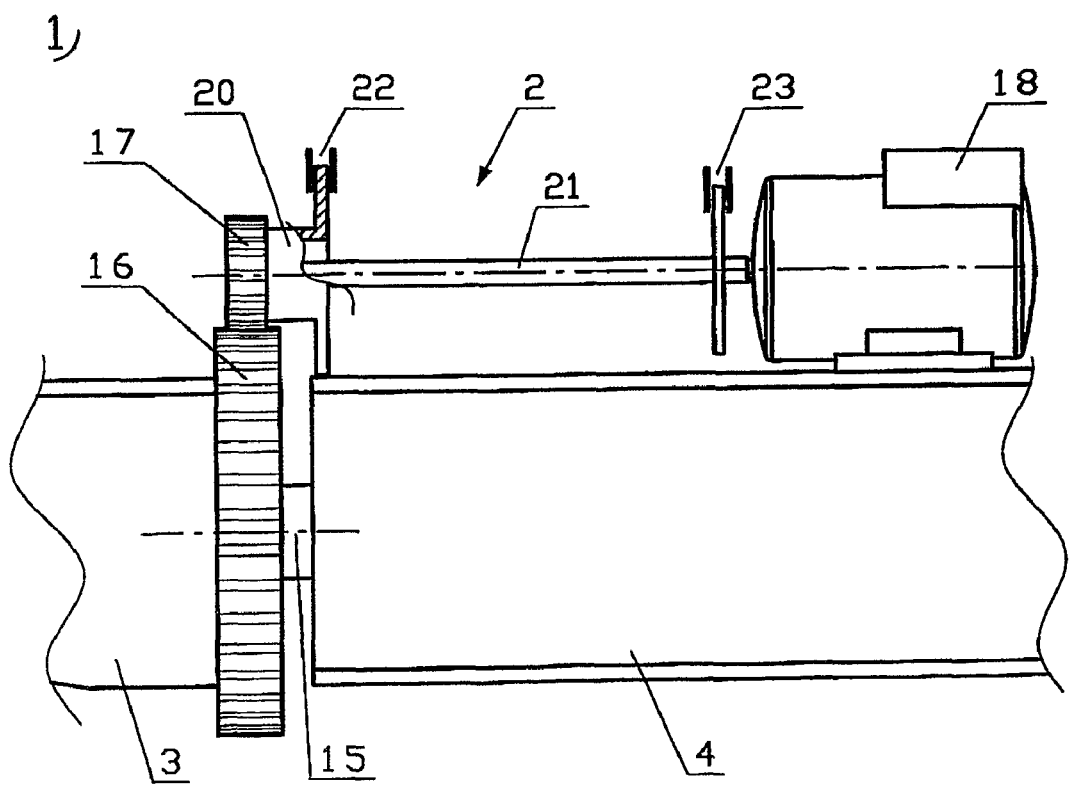
FIG. 6 shows an advantageous development of a positioning arrangement configured according to example of FIG. 5.

In a third development, the positioning arrangement 2 comprises two brake arrangements 22, 23 according to FIG. 6. These brake arrangements may be of suitable type, such as drum brake, disc brake, band brake or multidisc brake, for example. Multidisc brakes are advantageous with respect of the torque that each brake must be capable of absorbing. The one brake 22 is fitted directly adjoining the gear 17. The shaft 20 connecting the gear 17 to the brake 22 is hollow. This is made short and rigid in order that the locking of the frame halves can be done as rigidly as possible when so desirable, for example when driving at high speed.

The second brake 23 is fitted at one end of a longer torsion shaft 21, the other end of which is fixed into the gear 17. The torsion shaft 21 runs in the hollow shaft 20. The torsion shaft 21 makes it possible to lock the frame halves flexibly to one another when so desirable, for example when driving on uneven roads at relatively high speed. The springing characteristics of the torsion shaft 21 are determined in the same way as has been described above. The shafts 20 and 21 are advantageously supported and stabilized in some suitable way. This will be familiar to the person skilled in the art and therefore will not be described or illustrated further.

In this example the motor 18 can drive the positioning arrangement via either of the shafts 20 or 21. If the motor 18 drives the torsion shaft 21, the motor 18 can act at any point on the torsion shaft 21. The springing of the torsion shaft 21 is advantageously used in order to safeguard the motor 18; that is to say, the motor is fixed to one end of the torsion shaft 21. Should the facility of both rigid and resilient locking not be desirable, it is, of course, possible to use just one of the brake arrangements described above. If the ability to rotate the articulation with the positioning arrangement to the defined basic position is not desirable, it is also feasible to use one or more brake arrangements without the motor.

A first exemplary embodiment of a method for positioning and fixing the frame halves of an articulated vehicle in a predefined basic position includes a stage in which 2 guide arms 7, 8 positioned on one frame half 4 are brought against an operating heel 11 positioned on the second frame half 3 (see any of the FIGS. 2-4). As a result, the frame halves come to lie in one plane when the positioning arrangement fixes the frame halves to one another.

When the positioning arrangement 2 is in its inoperative condition, the guide arms 7, 8 are retracted so that the frame halves 3, 4 can rotate freely (see FIG. 1). When the positioning arrangement 2 is activated, the guide arms 7, 8 will move towards the center of the positioning arrangement 2. If the vehicle is standing on a level surface, that is to say the frame halves lie in one plane, bearing surfaces 9, 10 of the guide arms 7, 8 will encounter bearing surfaces 12, 13 of the operating heel 11 simultaneously and the articulation is fixed. If the vehicle is not standing on a level surface, that is to say if the frame halves do not lie in one plane, one of the bearing surfaces 9, 10 of the guide arms 7, 8 will first encounter one of the bearing surfaces 12, 13 of the operating heel 11. Thus, for example, bearing surface 9 first encounters bearing surface 12. The guide arm 9 will then bring the operating heel 11 towards the center of the positioning arrangement until the frame halves 3, 4 lie in one plane. Bearing surfaces 9, 10 of the guide arms 7, 8 will then bear against bearing surfaces 12, 13 of the operating heel 11 and the articulation is fixed.

Figure 5:
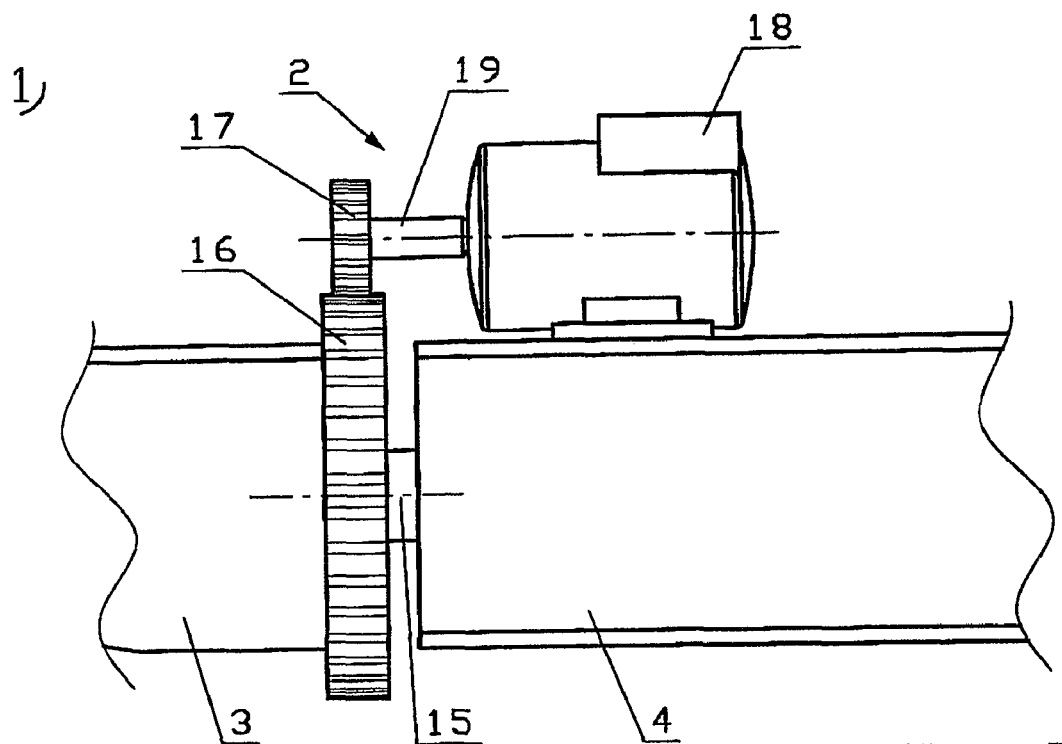
FIG. 5 shows an advantageous fourth exemplary embodiment of a positioning arrangement for a vehicle configured according to the invention.

A second exemplary embodiment of a method of positioning the frame halves of an articulated vehicle in a predefined basic position comprises the stage in which an adjusting device rotates a gear positioned on the first vehicle section against a gear segment positioned on the second vehicle section (see any of the FIGS. 5-6). The frame halves can then be fixed to one another. As a result, the frame halves will lie in one plane when the frame halves are fixed to one another.

When the positioning arrangement 2 is in its inoperative condition, the motor 18 is disengaged so that the frame halves 3, 4 can rotate freely. When the positioning arrangement 2 is activated, the motor 18 will rotate the gear 17 against the gear segment 16, so that the frame halves 3, 4 move towards a position where they lie in one plane with one another; that is to say, the predefined basic position. When the basic position has been reached, the motor is locked, thereby fixing the articulation.

In a first development of any of the methods conducted according to the present invention, the force fixing the frame halves of the vehicle to one another can be adjusted or controlled. This means that the springing and damping characteristics of the positioning arrangement can be adjusted in order to suit different driving situations.

In a second development of any of the methods conducted according to the invention, the vehicle halves can pass from the predefined basic position to an undefined position in the event of at least one first predefined occurrence. This means that the vehicle halves can rotate freely in relation to one another. This is desirable, for example, when driving on uneven ground where there is a risk that the vehicle will overturn. When the articulation is disengaged, the rear frame half can be allowed to overturn without the cab that contains the driver overturning. This disengagement may be triggered when a predefined value is exceeded. This value may be a function, for example, which includes one or more of the variables: pressure in a cylinder, angle of the vehicle, angular difference between the frame halves, speed of the vehicle or current turning radius. Disengagement is advantageously allowed to occur over a certain length of time; that is to say, with a certain damping so that the disengagement occurs smoothly.

In a third development of any of the methods conducted according to the invention, the vehicle sections can pass from an undefined position to the predefined basic position in the event of at least one second predefined occurrence. This means that the positioning arrangement assumes a fixed or damping condition from the disengaged condition. This may be desirable, for example, when driving on a level road when the speed increases in order to stabilize the vehicle. This transition to a fixed or sprung condition can be initiated when a predefined value is reached. This value may be a function, for example, which includes one or more of the variables: pressure in a cylinder, angle of the vehicle, angular difference between the frame halves, speed of the vehicle or current turning radius. The fixing sequence is advantageously allowed to occur over a certain length of time, so that the fixing occurs smoothly. It is also possible to inhibit this automatic fixing facility when a predefined value is exceeded, for example when the frame halves are rotated by more than a certain number of degrees in relation to one another.

The invention must not be regarded as being limited to the exemplary embodiments described above; a number of further variants and modifications being feasible without departing from the scope of the patented claims. A positioning arrangement according to the invention may also be used, for example, for other mechanical structures in which two structural parts are rotatable in relation to one another.

The invention claimed is:

1. An articulated vehicle comprising:
a first and a second frame half connected to an articulation that allows the first and the second frame halves to rotate in relation to one another about a longitudinal axis of the vehicle;
a positioning arrangement comprising at least one adjusting device; and
said positioning arrangement further comprising at least one means of operation operated by said at least one adjusting device in order to rotate the first and second frame halves about the longitudinal axis of the vehicle into a predefined basic position in relation to one another and wherein the positioning arrangement has operative and inoperative conditions in which the frame halves are fixed in the predefined basic position in relation to one another when the positioning arrangement is in the operative condition and in which the frame halves are freely rotatable in relation to one another when the positioning arrangement is in the inoperative condition and said inoperative condition is triggered when a predetermined angular difference between frame halves is determined;
wherein the means that operate the positioning arrangement comprise two guide arms operated by the at least one adjusting device.

2. The articulated vehicle as recited in claim 1, wherein the positioning arrangement comprises means of positioning which define the predefined basic position.

3. The vehicle as recited in claim 1,
wherein the positioning arrangement also has a semi-operative condition in which the force with which the adjusting device or the adjusting devices action can be adjusted or controlled.

4. The articulated vehicle as recited in claim 1, wherein the positioning arrangement can pass from the operative or semi-operative condition to the inoperative condition in the event of at least one first predefined occurrence.

5. The articulated vehicle as recited in claim 1, wherein the positioning arrangement can pass from the inoperative condition to the operative or semi-operative condition in the event of at least one second predefined occurrence.

6. The vehicle as recited in claim 1, wherein the positioning arrangement is divided into a plurality of sections.

7. The vehicle as recited in claim 1, wherein the positioning arrangement is concentrically supported around an articulation bearing.

8. The vehicle as recited in claim 1, wherein the means of operation of the positioning arrangement comprises at least one flexible element.

9. The articulated vehicle as recited in claim 1, wherein the means of operation of the positioning arrangement are hydraulic or electrical.

10. A method in an articulated vehicle having an articulation which allows a first and a second frame half to rotate in relation to one another about the vehicle longitudinal axis for rotating the first and second frame halves into a predefined basic position in relation to one another, said method comprising:
rotating at least one of the frame halves about the longitudinal axis of the vehicle into the predefined basic position by means of at least one adjusting device;
and providing two guide arms positioned on the first frame half and which are brought against two bearing surfaces positioned on the second frame half by means of at least one adjusting device.

11. The method as recited in claim 10, wherein the frame halves are fixed to one another when the frame halves are in the predefined basic position.

12. The method as recited in claim 10, wherein the force with which the at least one adjusting device acts can be adjusted.

13. The method as recited in claim 10, wherein the frame halves pass from the predefined basic position to an undefined position in the event of at least one first predefined occurrence.

14. The method as recited in claim 10, wherein the frame halves pass from an undefined position to the predefined basic position in the event of at least one second predefined occurrence.

* * * * *